(12) United States Patent
Lee et al.

(10) Patent No.: US 6,338,258 B1
(45) Date of Patent: Jan. 15, 2002

(54) REGENERATIVE EVAPORATIVE COOLER

(75) Inventors: Dae Young Lee; Byung Ha Kang, both of Seoul; Chun Sik Lee, Kyungki-do, all of (KR)

(73) Assignee: Korea Institute of Science and Technology (KR)

( * ) Notice: Subject to any disclaimer, the term of this patent is extended or adjusted under 35 U.S.C. 154(b) by 0 days.

(21) Appl. No.: 09/682,036

(22) Filed: Jul. 12, 2001

(30) Foreign Application Priority Data

Jan. 17, 2001 (KR) .......................................... 2001-2669

(51) Int. Cl.$^7$ ................................................ F28D 5/00
(52) U.S. Cl. ............................ 62/310; 62/305; 62/314; 62/121
(58) Field of Search ...................... 62/305, 310, 314, 62/316, 271, 121; 261/153, 154, 104; 165/54

(56) References Cited

U.S. PATENT DOCUMENTS

| | | | |
|---|---|---|---|
| 3,792,841 A | | 2/1974 | Munters |
| 4,090,370 A | * | 5/1978 | Vaugham ........................ 62/91 |
| 4,337,216 A | | 6/1982 | Korsell |
| 4,566,290 A | | 1/1986 | Otterbein |
| 4,827,733 A | | 5/1989 | Dihn |
| 4,935,169 A | * | 6/1990 | Ernst ........................... 261/153 |
| 4,976,113 A | * | 12/1990 | Gershuni et al. ............. 62/314 |
| 4,977,753 A | | 12/1990 | Maisotsenko et al. |
| 5,076,347 A | | 12/1991 | Fogleman |
| 5,143,658 A | | 9/1992 | Thomas |
| 5,301,518 A | | 4/1994 | Morozov et al. |
| 5,497,633 A | | 3/1996 | Jones et al. |
| 5,664,433 A | | 9/1997 | Bourne et al. |
| 5,727,394 A | | 3/1998 | Belding et al. |

FOREIGN PATENT DOCUMENTS

| | | |
|---|---|---|
| KR | 96-1649 | 1/1996 |
| KR | 1996-008336 | 2/1999 |
| KR | 2000-0020820 | 4/2000 |

\* cited by examiner

*Primary Examiner*—Henry Bennett
*Assistant Examiner*—Melvin Jones
(74) *Attorney, Agent, or Firm*—Burns, Doane, Swecker & Mathis, L.L.P.

(57) ABSTRACT

A regenerative evaporative cooler, designed to improve the cooling efficiency of its regenerative evaporative cooling unit, is disclosed. In the cooler of this invention, the cooling unit consists of a dry channel and a wet channel arranged to closely come into contact with each other. The dry channel allows primary air to pass through, while the wet channel extracts a part of the primary air from the outlet end of the dry channel so as to form extracted air flowing in the wet channel in a direction opposite to the flowing direction of the primary air. A plurality of cooling fins are arranged in the dry and wet channels to allow the extracted air to come into direct contact with water so as to improve the water vaporization efficiency and the water vaporization area in the wet channel. A first blower fan sucks the primary air into the dry channel, while a second blower fan sucks a part of the primary air of the dry channel into the wet channel so as to form the extracted air. A water supply unit feeds water to the wet channel. In the cooler of this invention, the extracted air flowing in the wet channel absorbs heat from the dry channel by means of the wet channel fin, thus cooling the primary air flowing in the dry channel.

6 Claims, 11 Drawing Sheets

REGENERATIVE EVAPORATIVE COOLER

BACKGROUND OF THE INVENTION

1. Field of the Invention

The present invention relates to evaporative coolers designed to distribute cool air currents, having a temperature lower than that of atmospheric air, to a target room without using refrigerant, different from typical air conditioners, and, more particularly, to a regenerative evaporative cooler designed to reduce the temperature of inlet air using latent heat of vaporization of water prior to distributing the air to a target room.

2. Description of the Prior Art

As well known to those skilled in the art, evaporative coolers spray water to air flowing in a channel, thus allowing the water to vaporize absorbing the latent heat from the air and subsequently the air to become cool before it is distributed from the cooler to a target room. Several types of evaporative coolers have been proposed and used in the prior art. For example, Korean Patent Laid-open Publication No. 96-1649, and U.S. Pat. Nos. 3,792,841 and 4,337,216 each disclose a direct-type evaporative cooler, which directly sprays water to inlet air and forms desired cool air prior to distributing the cool air to a target room. On the other hand, Korean Patent Laid-open Publication No. 2000-20820 discloses an indirect-type evaporative cooler, which primarily sprays water to processing air, and reduces the temperature of the processing air, and secondarily performs a heat exchanging process of reducing the temperature of inlet air by the low temperature processing air, thus indirectly cooling the inlet air prior to distributing the air to a target room. Korean Patent Laid-open Publication Nos. 1996-38336 and U.S. Pat. No. 4,566,290 each disclose another type of indirect-type evaporative cooler, which primarily reduces the temperature of processing water, and secondarily performs a heat exchanging process of reducing the temperature of inlet air by the low temperature processing water, thus indirectly cooling the inlet air prior to distributing the air to a target room. On the other hand, U.S. Pat. No. 5,664,433 discloses a combined-type evaporative cooler, which reduces the temperature of inlet air through a combined evaporative cooling system, formed by a combination of the direct- and indirect-type evaporative cooling systems.

When a conventional direct-type evaporative cooler is used within a closed room having poor ventilation, moisture is continuously generated from the vaporization process of the cooler and excessively increases the humidity of the room, thus making users in the room feel unpleasant, particularly when the cooler is used in an area of high temperature and high humidity. On the other hand, the indirect-type evaporative coolers do not change the humidity of a target room, thus being capable of distributing desired cool air currents making usersfeel pleasant, different from the direct-type evaporative coolers.

Such conventional evaporative coolers regardless of their types are advantageous in that they effectively conserve energy since they use energy only for operating blower fans during an operation. However, the temperature of cool air formed by the conventional evaporative coolers is undesirably limited by the wet-bulb temperature of inlet air, and so the evaporative coolers limitedly accomplish their desired operational effect in the case of an operation in an area of high temperature and low humidity; but they don't accomplish the desired operational effect in an area of high humidity.

In addition, a regenerative evaporative cooling system has been proposed, and used in the design of the prior art evaporative coolers. In a cooler using such a regenerative evaporative cooling system, it is ideally possible to reduce the temperature of air to a dew point of inlet air in place of the wet-bulb point of the inlet air. During a summer season of Korea, the dew point of atmospheric air is typically lower than the wet-bulb point of the atmospheric air by about 2~5° C., and so the regenerative evaporative cooler preferably reduces the temperature of cool air to a point lower than that of the other types of conventional evaporative coolers.

Figure 1A:
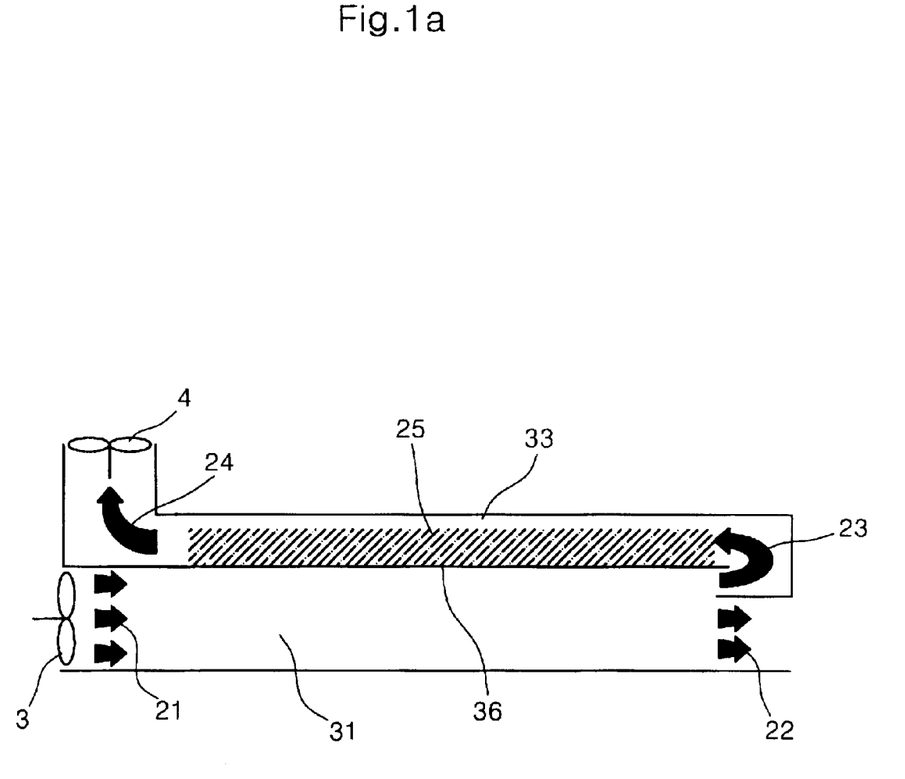
FIG. 1a is a view, showing the operation of a conventional regenerative evaporative cooler.

FIG. 1a is a view of a conventional regenerative evaporative cooler.

As shown in the drawing, during an operation of the regenerative evaporative cooler, hot inlet air 21 passes through a dry channel 31 of a heat exchanger while being reduced in its temperature through a heat exchanging process to form low temperature primary air 22. The low temperature primary air 22 from the dry channel 31 is partially extracted into the wet channel 33, arranged in parallel to the dry channel 31, and flows in the wet channel 33 in a direction opposite to that of the primary air 22 within the dry channel 31 as shown by the arrow 23 of the drawing. The extracted air 23 flowing in the wet channel 33 is cooled by the vaporization of water 25, thus being further reduced in its temperature. A temperature difference is formed between the two channels 31 and 33. Due to the temperature difference, the wet channel 33 absorbs heat from the dry channel 31, thus reducing the temperature of the air 21 flowing in the dry channel 31. In the above regenerative evaporative cooler, the phase variations of air flowing in the two channels 31 and 33 are shown in the psychrometric temperature-enthalpy chart of FIG. 1b.

Figure 1B:
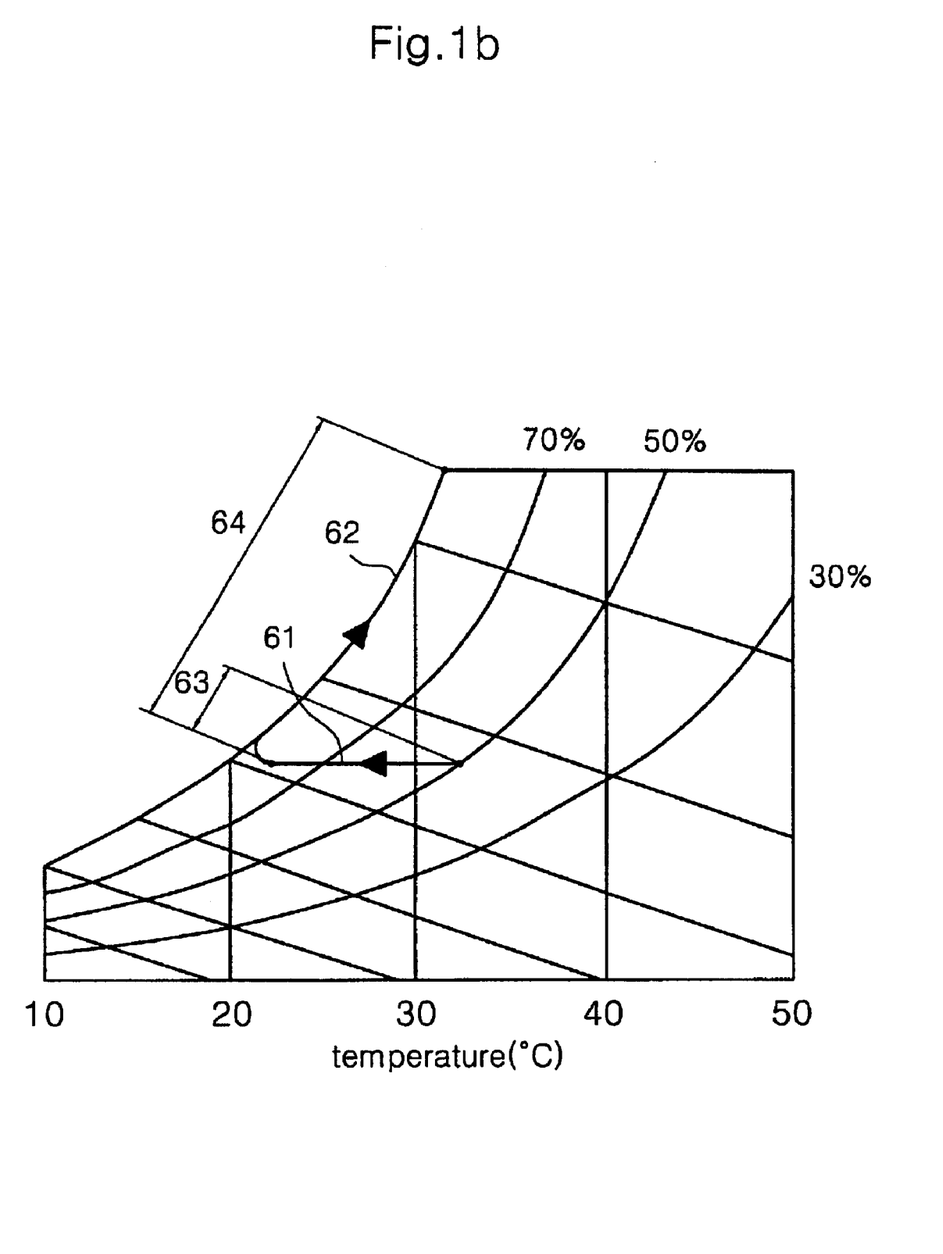

In the psychrometric temperature-enthalpy chart of FIG. 1b, the phase variation of primary air flowing in the dry channel 31 is designated by the reference numeral 61, while the phase variation of extracted air flowing in the wet channel 33 is designated by the reference numeral 62. As shown in the chart of FIG. 1b, the enthalpy variation 64 per unit mass flow rate of the extracted air is larger than the enthalpy variation 63 per unit mass flow rate of the primary air by about 3~5 times, and so the amount of extracted air, required to accomplish a desired energy balance between the two channels, is preferably set to $1/3$–$1/5$ of the amount of primary air. Therefore, the regenerative evaporative cooler can distribute cool air currents to a target room, with the amount of distributed cool air currents being set to $2/3$–$4/5$ of the primary air. As shown in the chart of FIG. 1b, the regenerative evaporative cooler effectively reduces the temperature of the primary air to the dew point of the primary air. In order to enlarge the temperature difference of the primary air between the inlet and outlet ends of the dry channel, it is preferable to arrange the dry and wet channels for the primary air and extracted air such that the flowing direction of the primary air is completely opposite to that of the extracted air to form countercurrents.

U.S. Pat. No. 5,301,518 discloses a conventional regenerative evaporative cooler. The cooler of 5,301,518 has a plurality of flat panels, separating a dry channel from a wet channel, and accomplishes a heat transfer from the dry channel to the wet channel through the flat panels. Therefore, the flat panels act as heat transfer panels in the regenerative evaporative cooler. In order to reduce a pressure loss caused by an air flow within the channels, the gap between the flat panels is set to about 1~2 mm, thus forming a narrow gap capable of forming a laminar flow of air within the channels.

In order to improve the operational performance of such regenerative evaporative coolers, it is necessary to allow water to be actively vaporized within the wet channel 33 of FIG. 1a, in addition to accomplishing an effective heat transfer between the dry channel 31 and the wet channel 33. However, the conventional regenerative evaporative cooler is designed to form a laminar flow of air within its channels by the heat transfer panels arranged with a gap of about 1~2 mm as described above, and so the cooler regrettably has a low heat transfer rate. It is thus necessary to sufficiently enlarge the size of the heat transfer panels in order to accomplish a desired heat transfer effect. However, when the heat transfer panels are enlarged in their sizes as described above, it is very difficult or almost impossible to maintain the desired gap of 1~2 mm between the enlarged heat transfer panels. Therefore, the heat transfer panels may be partially brought into contact with each other, or are enlarged in the gaps between them, thus causing an uneven distribution of air flow, reducing the effective heat transfer area and the effective heat transfer rate and reducing the operational performance of the regenerative evaporative coolers.

SUMMARY OF THE INVENTION

Accordingly, the present invention has been made keeping in mind the above problems occurring in the prior art, and an object of the present invention is to provide a regenerative evaporative cooler, which improves the heat transfer rate between the dry and wet channels, in addition to improving the evaporation rate of water within the wet channel, thus accomplishing improved cooling effect, and which minimizes the pressure loss due to air flow within the dry and wet channels, and which enlarges the width of the dry and wet channels to about 5~20 mm, thus almost completely overcoming the problems experience in the conventional process of manufacturing the regenerative evaporative coolers.

In order to accomplish the above object, the present invention provides a regenerative evaporative cooler, comprising: a regenerative evaporative cooling unit consisting of a dry channel and a wet channel arranged in the cooling unit to closely come into contact with each other, the dry channel being used for allowing primary air to pass through, the wet channel being used for extracting a part of the primary air from the outlet end of the dry channel so as to form extracted air flowing in the wet channel in a direction opposite to the following direction of the primary air, the cooling unit also including a plurality of cooling fins arranged in the dry and wet channels to enhance the heat transfer in the dry channel and to improve both water vaporization efficiency and water vaporization area in the wet channel; a first blower fan used for sucking the primary air into the dry channel of the cooling unit; a second blower fan used for sucking a part of the primary air of the dry channel into the wet channel so as to form the extracted air; and a water supply unit used for feeding water to the wet channel, whereby the extracted air flowing in the wet channel absorbs heat from the dry channel by means of the cooling fin of the wet channel, thus cooling the primary air flowing in the dry channel.

In the regenerative evaporative cooler of this invention, a direct-type evaporative cooling pad is provided at the outlet end of the dry channel for further reducing the temperature of the primary air from the dry channel through a direct-type evaporative cooling process.

In addition, a plurality of water outlet ports are formed on the cooling fin of the wet channel to form a zigzag arrangement, thus uniformly wetting the surface of the cooling fin of the wet channel.

In an embodiment of this invention, the wet channel is arranged to allow the extracted air of the regenerative evaporative cooling unit to flow in a vertical direction, with the water supply unit supplying water to the upper end of the wet channel, thus allowing the water to flow downward due to gravity while uniformly wetting the surface of the cooling fin of the wet channel.

In another embodiment, the wet channel is arranged to allow the extracted air of the regenerative evaporative cooling unit to flow in a direction inclined relative to a vertical direction at a predetermined angle of inclination, with a plurality of water outlet ports being formed on the cooling fin of the wet channel to allow water to uniformly wet the surface of the cooling fin of the wet channel.

In the regenerative evaporative cooler of this invention, the dry and wet channels are fabricated into a unit module used in the cooler, with a cooling capacity of the cooler being adjustable by controlling the number of unit modules included in the cooler.

BRIEF DESCRIPTION OF DRAWINGS

The above and other objects, features and other advantages of the present invention will be more clearly understood from the following detailed description taken in conjunction with the accompanying drawings, in which:

FIG. 1b is a psychrometric temperature-enthalpy chart of the conventional regenerative evaporative cooler of FIG. 1a;

DETAILED DESCRIPTION

Reference now should be made to the drawings, in which the same reference numerals are used throughout the different drawings to designate the same or similar components.

Figure 2:
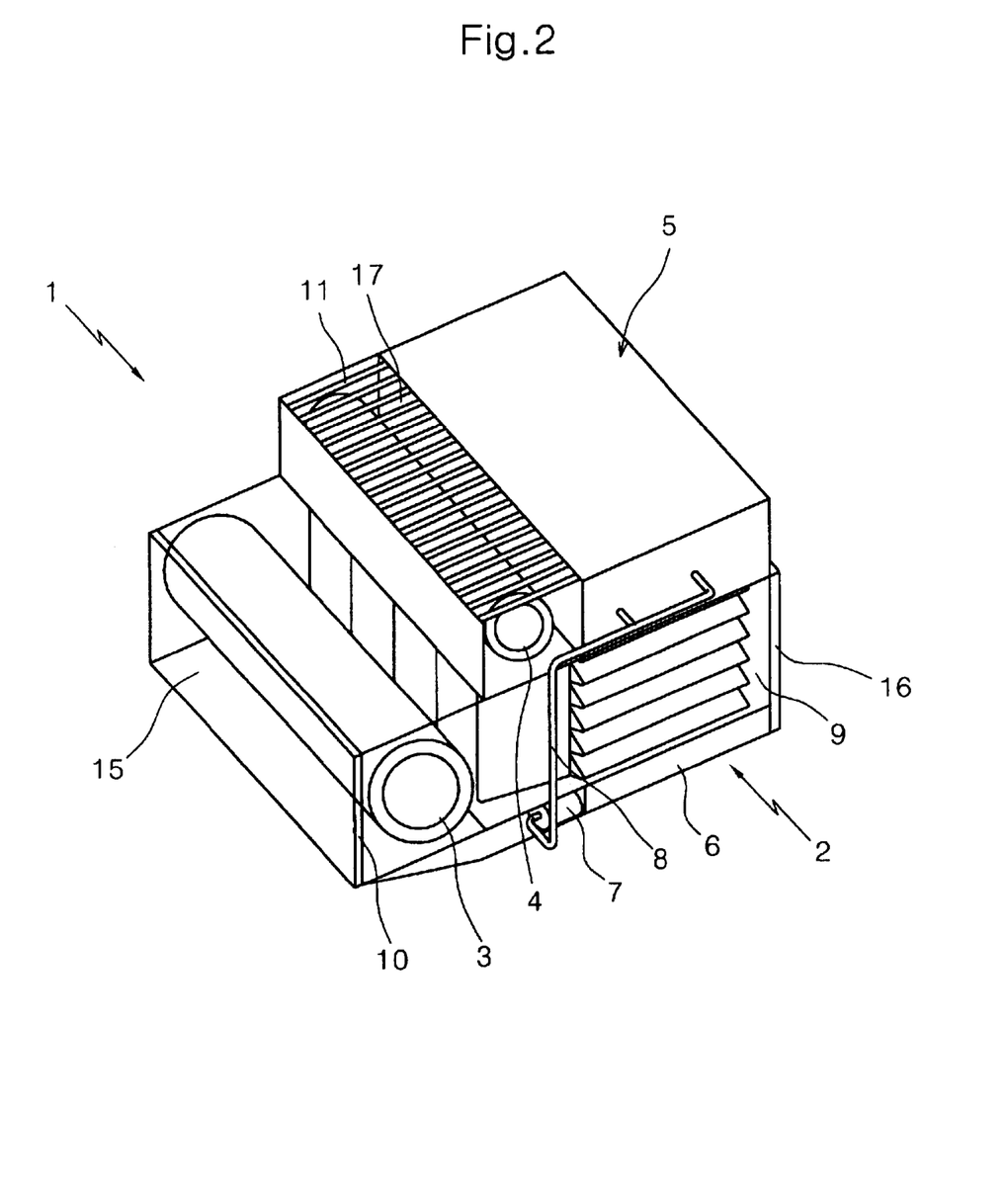
FIG. 2 is a perspective view, showing an appearance of a regenerative evaporative cooler in accordance with the primary embodiment of the present invention.

FIG. 2 is a perspective view, showing an appearance of a regenerative evaporative cooler in accordance with the primary embodiment of the present invention.

As shown in FIG. 2, the regenerative evaporative cooler 1 of this invention comprises a regenerative evaporative cooling unit 2, a first blower fan 3 used for sucking primary air into the dry channel 31 of the cooling unit 2, and a second blower fan 4 used for sucking a part of the primary air of the dry channel into the wet channel 33 so as to form extracted air flowing in the wet channel 33. The cooler 1 also includes a water supply unit. This water supply unit consists of a water supply tank 5, which is used for supplying water to the cooling unit 2. The water supply unit also has a drain water tray 6, a water pump 7, and a water supply pipe 8. In the water supply unit, the drain water tray 6 contains drain water discharged from the cooling unit 2, while the water pump 7 is used for pumping water from the water tray 6 to the cooling unit 2. The water supply pipe 8 feeds water from the pump 7 to the water supply tank 5. In addition, a direct-type evaporative cooling pad 9 is included in the cooler 1 of this invention. This cooling pad 9 is provided at the outlet end of the dry channel 31 and is used for further reducing the temperature of outlet air from the dry channel 31 through a direct-type evaporative cooling process before the air is distributed from the cooler 1 to a target room.

Figure 3:
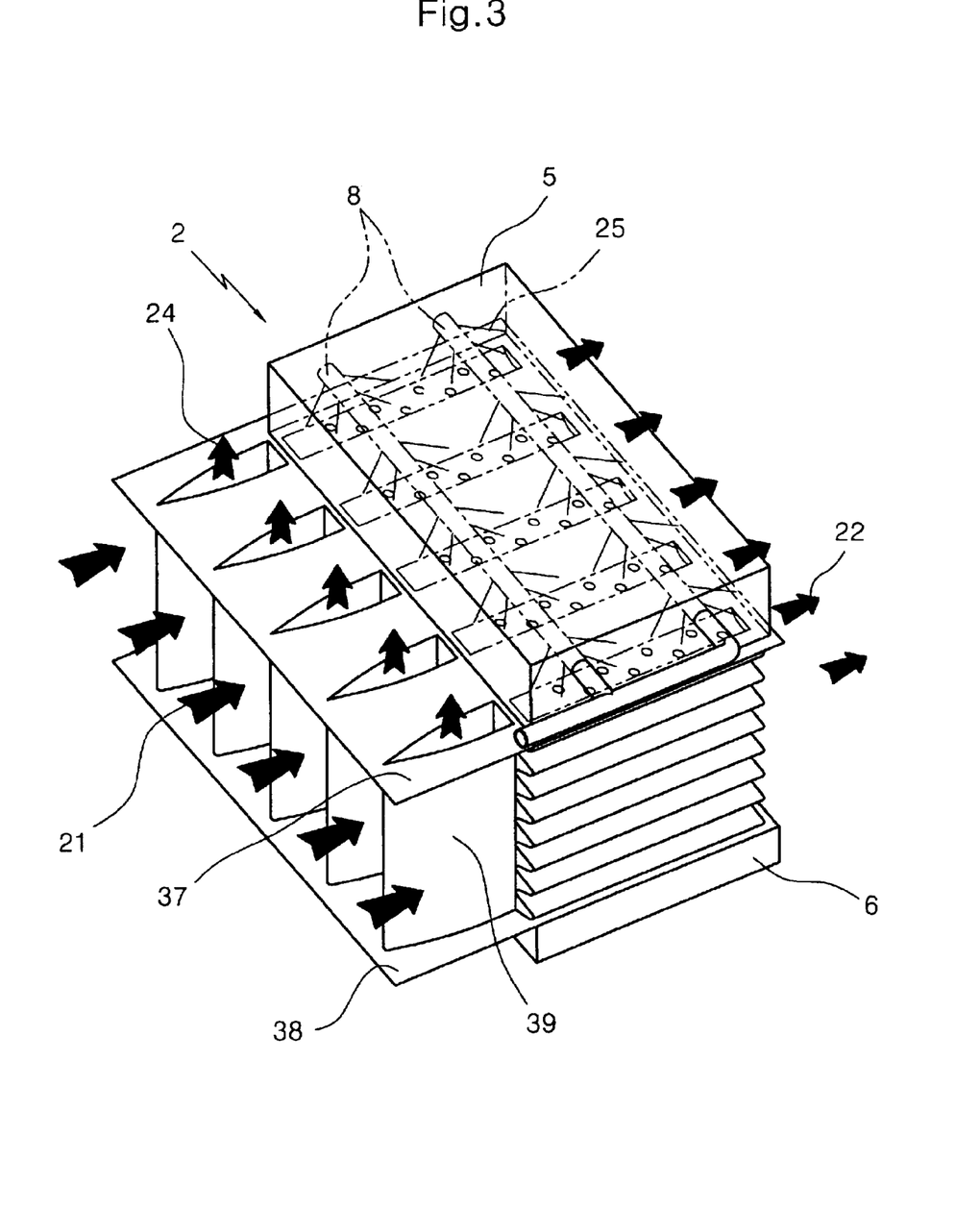
FIG. 3 is a perspective view, showing the construction and operation of a regenerative evaporative cooling unit included in the cooler of this invention.
Figure 4A:
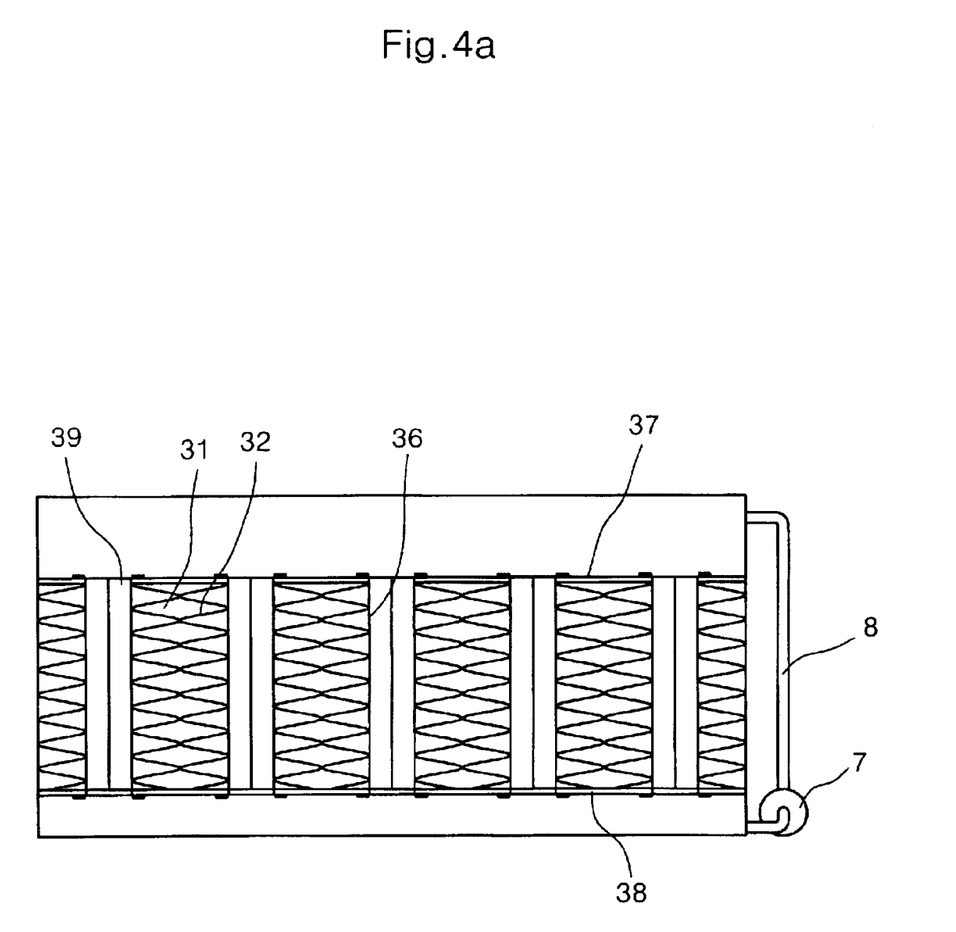
FIGS. 4a and 4b are a front view and a rear view of the regenerative evaporative cooling unit of FIG. 3.
Figure 4B:
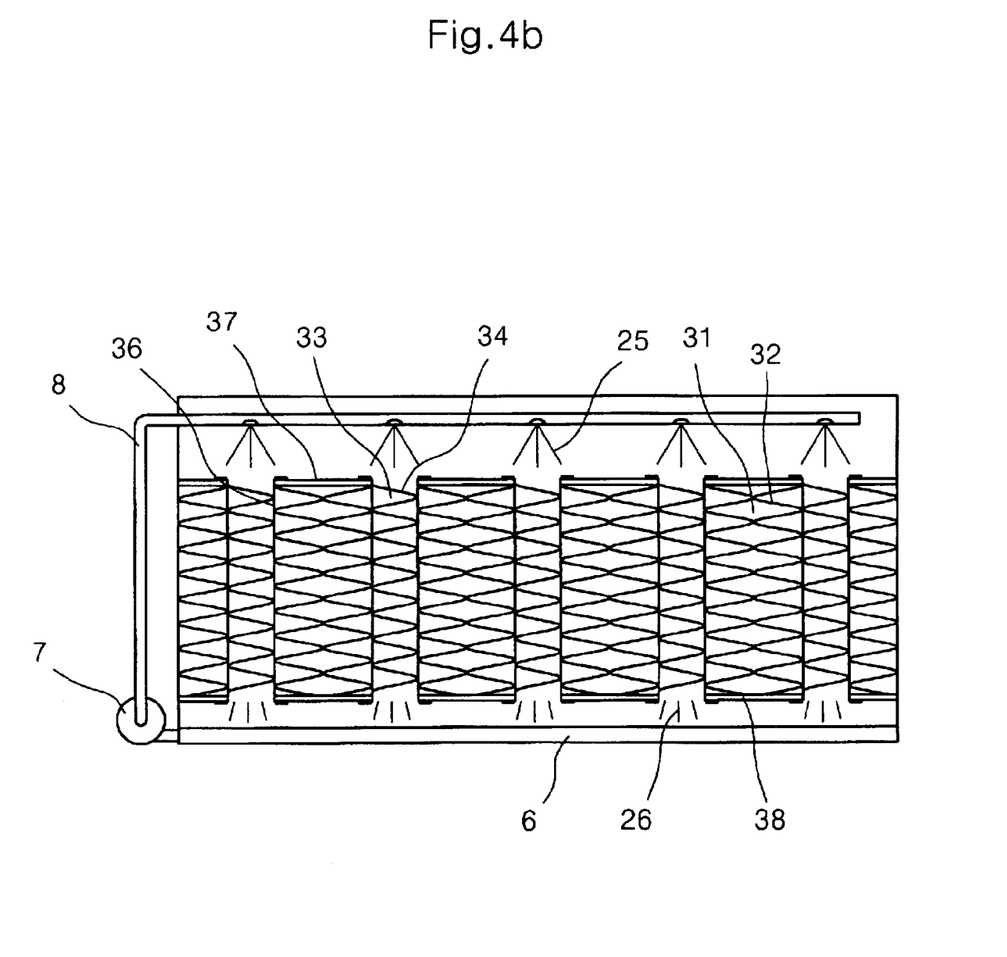

FIG. 3 is a perspective view, showing the construction and operation of the regenerative evaporative cooling unit 2 assembled with the water supply unit, which consists of the water supply tank 5, the drain water tray 6, the pump 7 and the water supply pipe 8. FIGS. 4a and 4b are a front view and a rear view of the regenerative evaporative cooling unit 2 of FIG. 3.

As shown in FIGS. 3, 4a and 4b, the regenerative evaporative cooling unit 2 comprises a dry channel 31 and a wet channel 33. In an operation of the cooling unit 2, primary air passes through the dry channel 31, while extracted air passes through the wet channel 33. The dry channel 31 and the wet channel 33 are separated from each other through a partition wall 36, with a plurality of cooling fins, or dry and wet channel fins 32 and 34, arranged in the dry and wet channels 31 and 33 to improve the heat transfer effect within the channels 31 and 33.

When the regenerative evaporative cooling unit 2 is shown from the front of the unit 2, the wet channel 33 is closed, and so the primary air 21, sucked into the unit 2 by the suction force of the first blower fan 3, only flows through the dry channel 31. At the rear end of the regenerative evaporative cooling unit 2, a part 23 of the primary air 21 from the dry channel 31 is sucked into the wet channel 33 by the suction force of the second blower fan 4, thus flowing in the wet channel 33 in a direction opposite to that of the primary air 21 within the dry channel 31. The remaining part of the primary air 21, except for the part 23 sucked into the wet channel 33, passes through the direct-type evaporative cooling pad 9 prior to being discharged to a target room.

Figure 5:
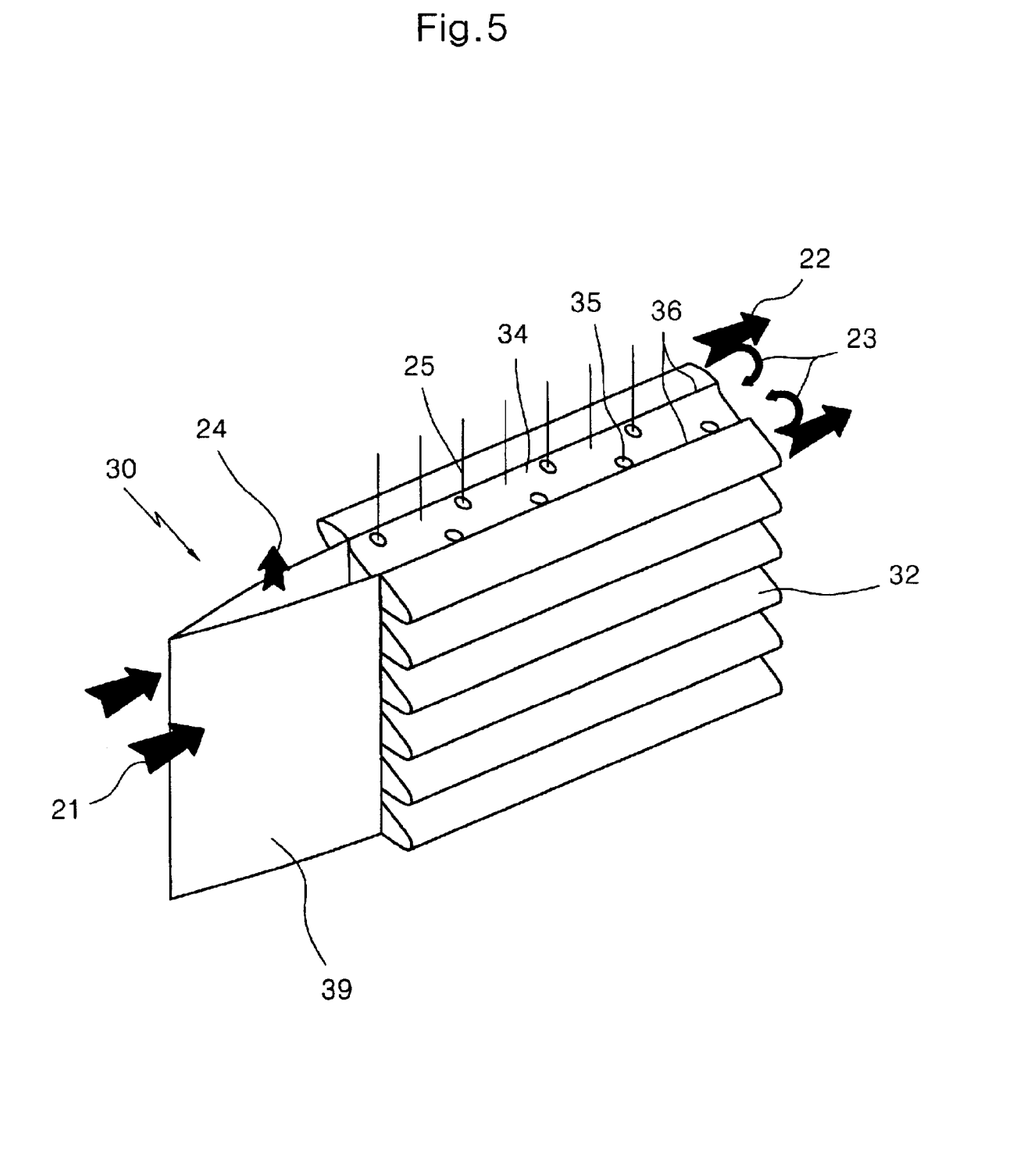
FIG. 5 is a perspective view, showing the construction and operation of a unit module included in the regenerative evaporative cooling unit of this invention.
Figure 6:
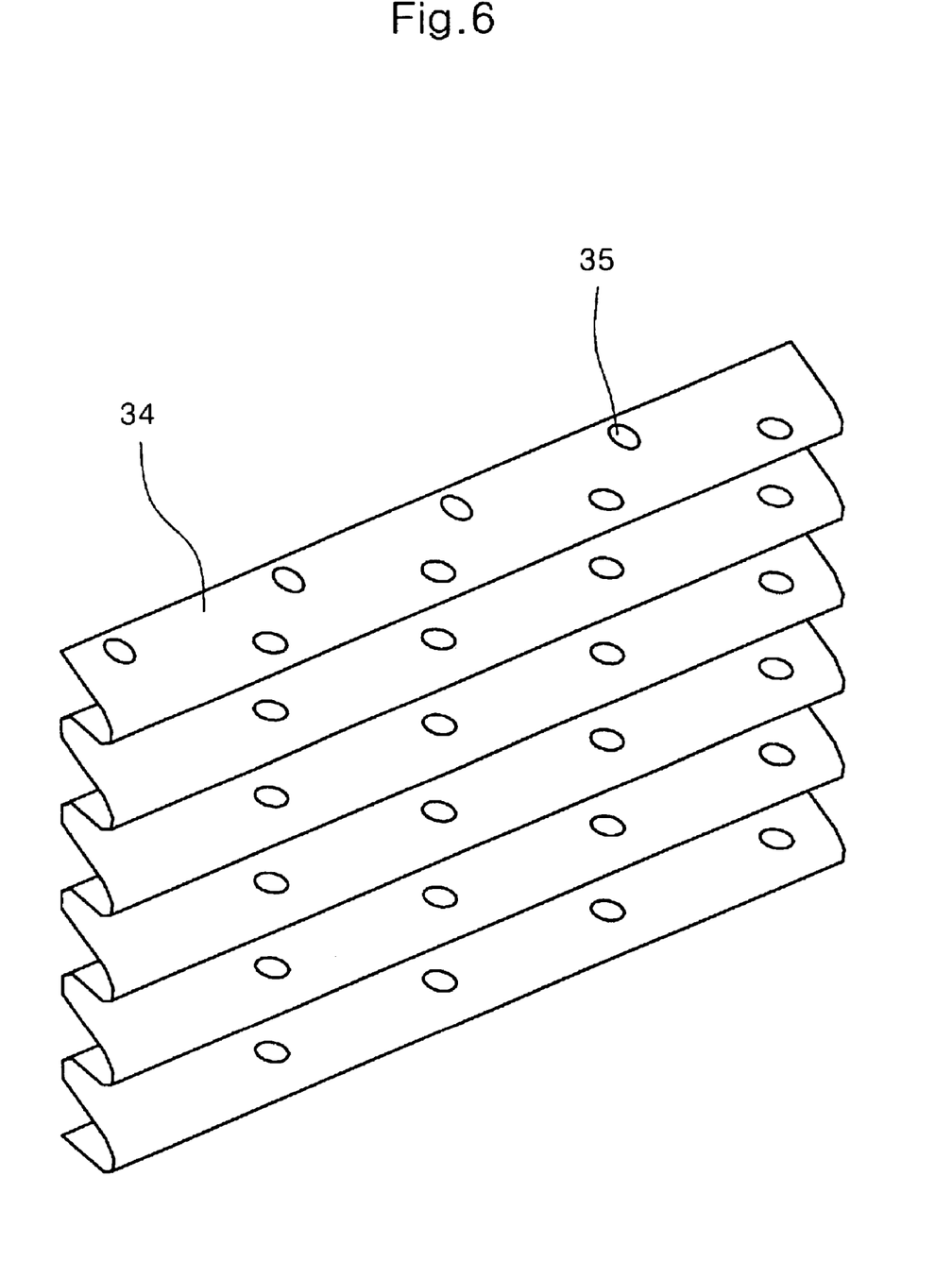
FIG. 6 is a perspective view of a wet channel fin included in the regenerative evaporative cooler of this invention.

In such a case, water is fed from the water supply unit to the wet channel 33. That is, as shown in FIGS. 5 and 6, water 25 flows downward to the lower portion of the wet channel 33 through a plurality of water outlet ports 35 formed on the wet channel fin 34, thus uniformly wetting the surface of the fin 34. At the wet surface of the wet channel fin 34, water is vaporized in the extracted air 23 and reduces the temperature of the wet channel fin 34 due to latent heat of vaporization of water, thus forming a desired temperature difference between the dry and wet channels 31 and 33 and allowing a heat transfer from the dry channel 31 to the wet channel 33.

Heat, transferred from the dry channel 31 to the wet channel fin 34, maintains the temperature of the wet channel fin 34 higher than that of the extracted air 23, thus allowing water to be actively evaporated from the surface of the wet channel fin 34. The extracted air 23 from the wet channel 33 is guided to the upper portion of the front of the cooling unit under the guide of an extracted air guide passage 39, and is discharged to the atmosphere by the blowing force of the second blower fan 4.

As shown in FIGS. 4a and 4b, the upper end of the dry channel 31 is closed by an upper panel 37, and so water from the water supply unit does not flow into the dry channel 31 during an operation, but exclusively flows into the wet channel 33. in addition, the lower end of the dry channel 31 is closed by a lower panel 38, and so air does not flow from the dry channel 31 to the wet channel 33 through the lower portion of the cooling unit 2. The lower portion of the wet channel 33 communicates with the drain water tray 6, and so water 26 remaining from the vaporization of water 25 is drained from the wet channel 33 to the drain water tray 6.

FIG. 5 is a perspective view, showing the construction and operation of a unit module 30 included in the regenerative evaporative cooling unit 2 of this invention. As shown in the drawing, the unit module 30 comprises a wet channel 33, a werfin 34 provided within said wet channel 33, a partition wall 36 separating the wet channel 33 from the dry channel 31, a dry channel fin 32 provided on the outer surface of the partition wall 36, and an extracted air guide passage 39. FIG. 5 shows the air cooling process of the unit module 30 of the regenerative evaporative cooling unit 2.

FIG. 6 is a perspective view of the wet channel fin 34 included in the regenerative evaporative cooler 1 of this invention. As shown in the drawing, a plurality of water outlet ports 35 are formed on the wet channel fin 34 such that the ports 35 form a zigzag arrangement on the fin 34. Therefore, water 25 flows downward while uniformly wetting the surface of the wet channel fin 34.

A desired number of unit modules 30 of FIG. 5 are parallely arranged to form a regenerative evaporative cooling unit 2 having a desired cooling capacity. During an operation of the cooling unit 2, water 26 remaining from the vaporization of water 25 is primarily drained from the lower portion of the wet channel 33 to the drain water tray 6. The water drained to the tray 6 is, thereafter, pumped by the water pump 7, and flows through the water supply pipe 8 to reach the water supply tank 5 prior to being fed to the wet channel 33 of the cooling unit 2.

Figure 7:
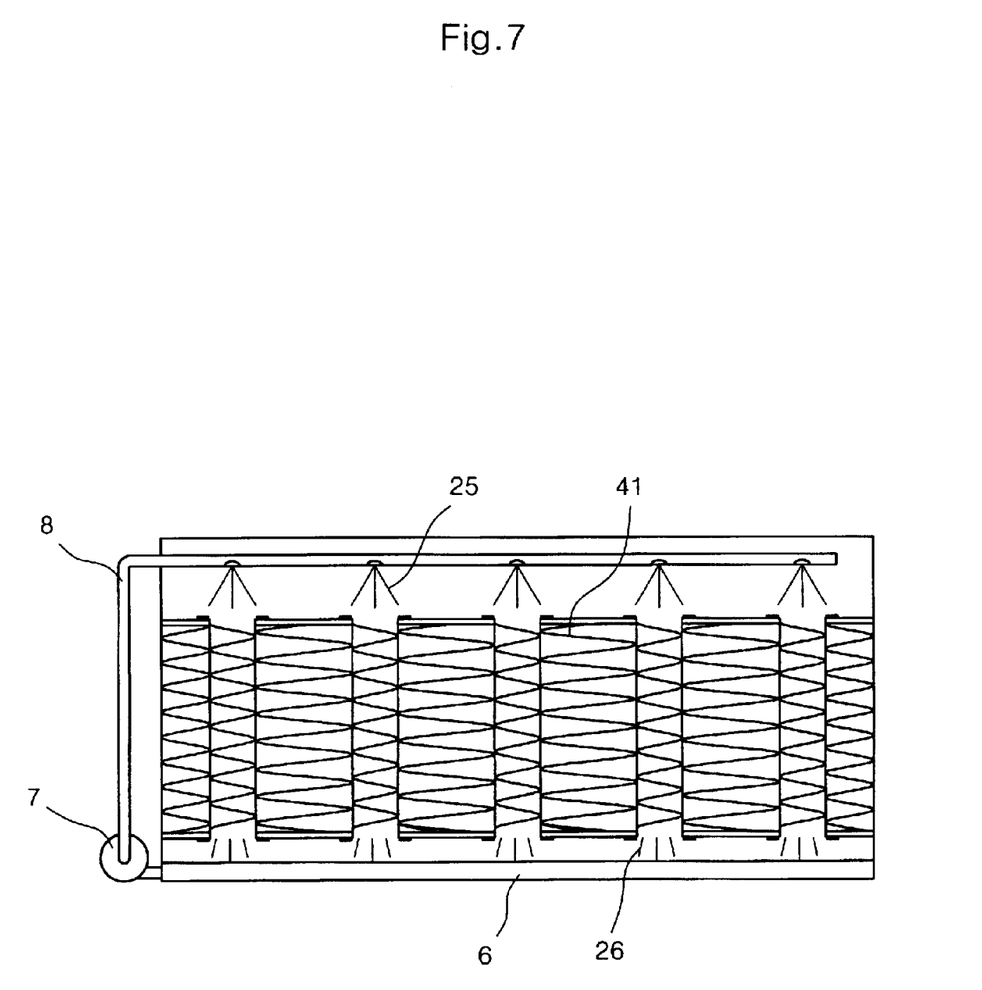
FIG. 7 is a rear view of an integrated-type regenerative evaporative cooling unit in accordance with another embodiment of the present invention.

FIG. 7 is a rear view of an integrated-type regenerative evaporative cooling unit in accordance with another embodiment of the present invention. In this embodiment, the regenerative evaporative cooling unit is fabricated in the form of an integrated-type structure in place of an assemblage of the unit modules 30. In the regenerative evaporative cooling unit of this embodiment, the dry channel is formed by a single fin 41 in place of two fins arranged to face each other.

Figure 8:
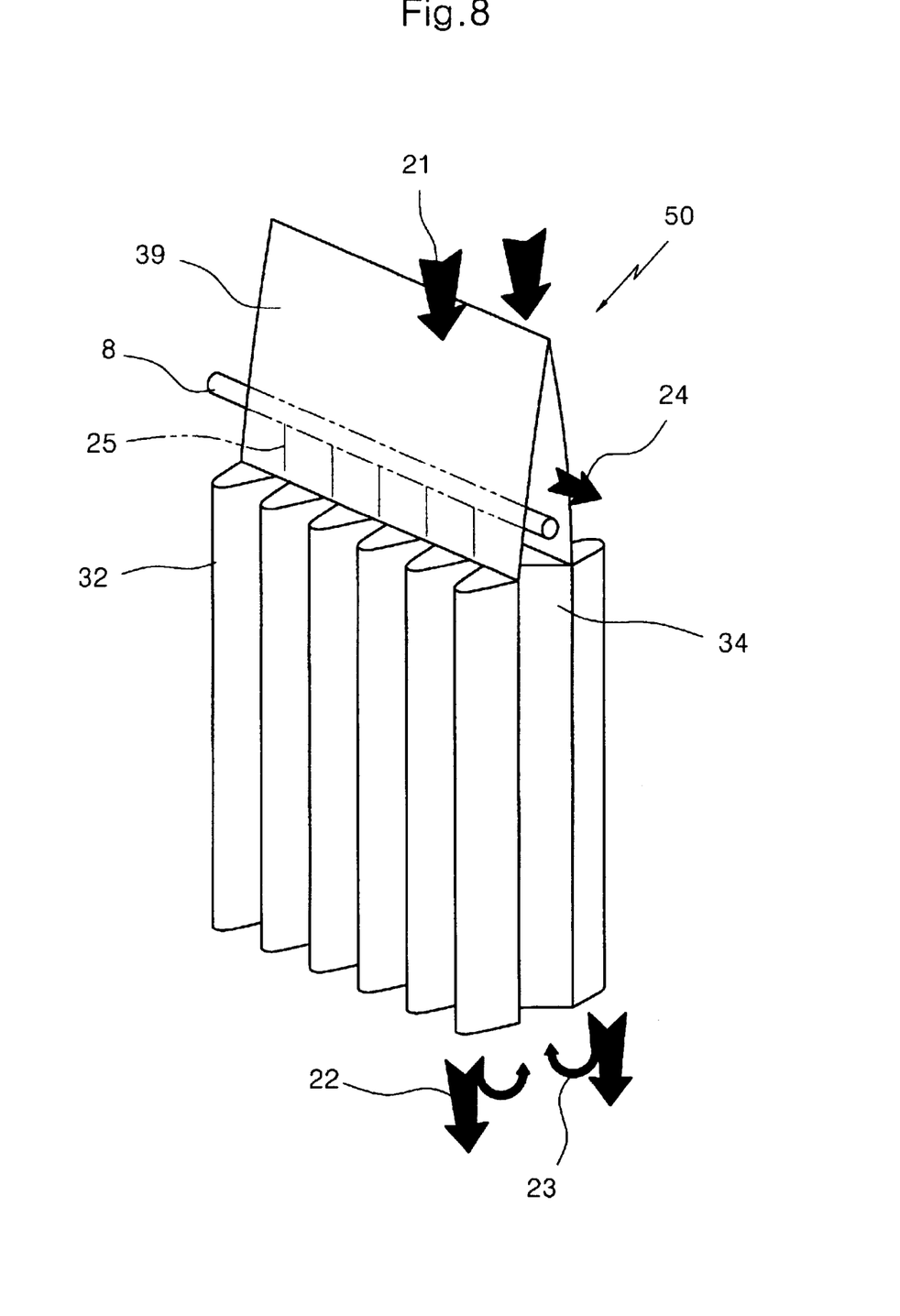
FIG. 8 is a perspective view, showing the construction and opera-lion of a unit module included in a vertical-type regenerative evaporative cooling unit in accordance with a further embodiment of the present invention.

FIG. 8 is a perspective view, showing the construction and operation of a unit module 50 included in a vertical-type regenerative evaporative cooling unit in accordance with a further embodiment of the present invention. In this embodiment, the primary air 21 flows downward in a direction perpendicular to the ground surface. In such a case, the extracted air 23 flows upward in the direction perpendicular to the ground surface. Water 25 fed to the wet channel 33 flows from the upper end to the lower end of the wet channel 33 due to gravity. That is, the flowing direction of the water 25 within the wet channel 33 is opposite to the flowing direction of the extracted air 23. In this embodiment, it is not necessary to form an additional water outlet port on the wet channel fin 34. During an operation, water naturally and smoothly flows downward due to gravity while wetting the wet channel fin 34.

Figure 9:
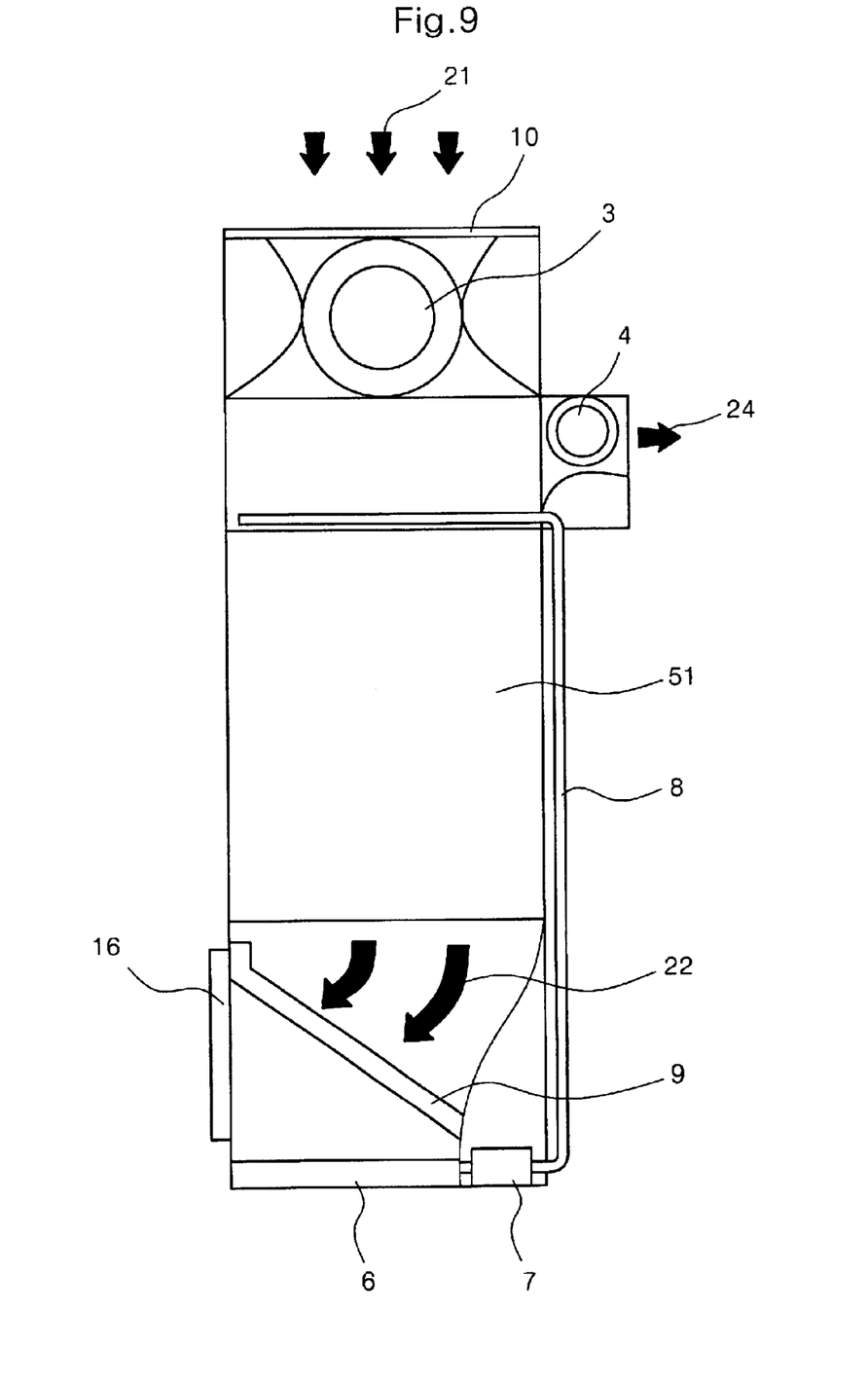
FIG. 9 is a view, showing the operation of a cooler including the vertical-type regenerative evaporative cooling unit of FIG. 8.

FIG. 9 is a view, showing the operation of a cooler including a vertical-type regenerative evaporative cooling unit 51 having the unit modules 50 of FIG. 8. In order to fabricate the cooler of FIG. 9, a plurality of unit modules 50 are assembled together to form a vertical-type regenerative evaporative cooling unit 51 prior to fabricating a desired cooler. In the cooler of FIG. 9, the general shape of the cooler remains the same as that of FIG. 2, but the flowing direction of water within the wet channel is completely opposite to that of extracted air.

As described above, the present invention provides a regenerative evaporative cooler, which is designed to remarkably improve the cooling efficiency of its regenerative evaporative cooling unit. In order to accomplish the above object, a plurality of fins are installed in the dry and wet channels of the cooling unit, thus enlarging both the heat transferring area and the water vaporization area of the cooling unit and remarkably improving the heat transfer effect and the water vaporization efficiency of the cooling unit. it is thus possible for the regenerative and evaporative cooler of this invention to preferably reduce the temperature of room air lower by about 2~5° C. in comparison with conventional regenerative evaporative coolers even if it is used in an area of high humidity.

Therefore, the regenerative evaporative cooler of this invention is preferably usable in an area of high humidity, different from conventional regenerative evaporative coolers limitedly usable in an area of low humidity. This invention thus remarkably enlarges the use of such regenerative evaporative coolers. Another advantage of the regenerative evaporative cooler of this invention resides in that it preferably and remarkably conserves energy since it only uses energy for the operation of blower fans during an operation.

Although a preferred embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. A regenerative evaporative cooler, comprising:
   a regenerative evaporative cooling unit consisting of a dry channel and a wet channel arranged in the cooling unit to closely come into contact with each other, said dry channel being used for allowing primary air to pass through, said wet channel being used for extracting a part of the primary air from an outlet end of the dry channel so as to form extracted air flowing in the wet channel in a direction opposite to a flowing direction of the primary air, said cooling unit also including a plurality of cooling fins arranged in said dry and wet channels to allow the extracted air to come into direct contact with water so as to improve both water vaporization efficiency and water vaporization area in the wet channel;
   a first blower fan used for sucking the primary air into the dry channel of the cooling unit;
   a second blower fan used for sucking a part of the primary air of the dry channel into the wet channel so as to form the extracted air; and
   a water supply unit used for feeding water to said wet channel, whereby the extracted air flowing in the wet channel absorbs heat from the dry channel by means of the cooling fin of said wet channel, thus cooling the primary air flowing in the dry channel.

2. The regenerative evaporative cooler according to claim 1, wherein a direct-type evaporative cooling pad is provided at the outlet end of said dry channel for further reducing the temperature of the primary air from the dry channel through a direct-type evaporative cooling process.

3. The regenerative evaporative cooler according to claim 1, wherein a plurality of water outlet ports are formed on the cooling fin of said wet channel to form a zigzag arrangement, thus uniformly wetting the surface of said cooling fin of the wet channel.

4. The regenerative evaporative cooler according to claim 1, wherein the wet channel is arranged to allow the extracted air of the regenerative evaporative cooling unit to flow in a vertical direction, with the water supply unit supplying water to an upper end of the wet channel, thus allowing the water to flow downward due to gravity while uniformly wetting the surface of said cooling fin of the wet channel.

5. The regenerative evaporative cooler according to claim 1, wherein the wet channel is arranged to allow the extracted air of the regenerative evaporative cooling unit to flow in a direction inclined relative to a vertical direction at a predetermined angle of inclination, with a plurality of water outlet ports being formed on the cooling fin of said wet channel to allow water to uniformly wet the surface of said cooling fin of the wet channel.

6. The regenerative evaporative cooler according to claim 1, wherein said dry and wet channels are fabricated into a unit module used in the cooler, with a cooling capacity of the cooler being adjustable by controlling the number of unit modules included in the cooler.

\* \* \* \* \*